Patented July 12, 1932

1,867,180

UNITED STATES PATENT OFFICE

ADOLF SCHWALZ, OF FARM COLONY, STATEN ISLAND, NEW YORK

CEMENTITIOUS COMPOSITION AND METHOD OF MAKING SAME

No Drawing.   Application filed March 27, 1931.   Serial No. 525,873.

The present invention relates to building material in general, and particularly to cementitious compositions and the process of making them.

One of the objects of my invention is to provide a cementitious composition of slow setting qualities, which when hardened, will form a solid mass impervious to moisture, heat, cold, etc., and which will be unaffected by weather.

Another object of my invention is to provide a cementitious composition which will not only set slowly, but which will not crack, while setting or after setting and which will, when set, acquire a hardness of stone.

Another object of my invention is to provide a cementitious composition, which, due to its slow setting quality may be readily mixed in large quantities, facilitating working therewith for relatively long time periods, uninterrupted by preparing new material, which will require neither sponging nor spraying to prevent it from setting, and which will permit more readily, spreading or other application, without undue haste and at a lesser exertion of energy, while assuring uniform and more thorough workmanship at lesser time expenditure.

Another object of my invention is to provide a cementitious composition which, besides having the aforesaid qualities, may be provided with various fragments, lending to the finished work a permanent characteristic or coloring, whereby costly and frequent painting or otherwise preserving the surfaces is eliminated.

Another object of my invention is to provide a composition of this kind which may be finished like marble or mosaic, and which may be provided with an extremely glossy or glazed surface, when desired, and which may be used for sculptural decorations of relief or plastic nature, either independently of, or in connection with wall work.

Another object of my invention is to provide a cementitious or plastery composition which may be cleansed, after setting, with hot water in the way nautral stone is washed.

Still another object of my invention is the process or method of producing such cementitious composition of the aforesaid properties and qualities.

The foregoing and still further objects of my invention will be more fully understood from the following description of the method of compounding the various constituents of my composition, and although I shall state specific ingredients and their quantities used, and the manner in which they are mixed, be it understood that I shall not be limited to the exact disclosure, except as it is defined by the claims.

In preparing my composition, I have found that the most satisfactory results were obtained by compounding the different ingredients in the following proportions:

|  | Pounds |
|---|---|
| Magnesium oxide | about 2 |
| Alum (commercial) | about 2 |
| Caustic soda | about 3 |
| Whiting (pigment) | about 2 |
| Salt (NaCl) | about 1 |
| Lime (slaked) | about 100 |
| Sand (siliceous) very fine | about 125 |
| Water | about 67 |

First, a brine mixture of water and salt, magnesium oxide, alum, caustic soda is prepared using about five gallons, equal to about 43 lbs. of hot or cold water, and after thoroughly stirring it the mixture is permitted to stand for 24 hours or longer, until all ingredients are dissolved.

The thus obtained brine mixture is now compounded with the whiting, the lime and the sand while being stirred, and the rest of the water is added until the consistency of the mixture is such, as to form a paste-like, cementitious batch which may be readily spread or otherwise handled with a trowel, in the manner ordinary mortar or cement is worked.

This mixture will not set quickly and therefore will not require moistening during its application, or adding water to the surplus batch, in order to keep it workable, as is required with ordinary plaster or cement mortar.

The sand employed in my mixture constitutes what may be termed the "filler" of the composition, while the whiting is used as pigment. Such sand mixture will be found most effective for use in what is known as outside "stucco work", but it will also serve admirably for an inner wall covering and for fabricating artificial building material, as blocks slabs, tiles, etc., I preferably use finely ground, white sand of a siliceous origin, however other kinds of filler may be employed with equally satisfactory results.

When it is desired to render the mixture more ornate than white, a coloring other than whiting may be substituted or added. However, the appearance of my mixture may be still further enhanced when it becomes desirable to produce imitations of marble, gold, silver, bronze or other matter. For marble imitations, marble dust is used as filler instead of sand, or in desired proportion with the latter. Metallic effects may be produced by admixing thin flakes or leaves of the desired metal to the top coating.

The mixture may also be polished or glazed after it has been applied, by spraying the surface with talcum and passing over it a hot iron.

From the foregoing it will become readily evident that my mixture is capable of producing any desired decorative effects, and may be employed therefore in any number of ways, shapes or forms, so that its application may be considered universal.

It is also obvious, that its application for different uses will of necessity require manifold changes in its composition and I therefore reserve for myself the right to make such changes, or incorporate improvements therein without departing from the broad spirit of my invention, for which I claim:

1. A slow setting cementitious composition consisting of magnesium oxid 2 parts, alum 2 parts, caustic soda 3 parts, salt 1 part, lime 100 parts, water 67 parts, a pigment 2 parts and a filler 125 parts substantially as described.

2. A slow setting cementitious composition consisting of a brine mixture including magnesium oxide, caustic soda and alum, comixed with lime, a pigment and a filler, admixed with water, substantially as described.

3. The process of producing a slow setting cementitious composition, which consists in providing a brine of salt and water, admixing it with magnesium oxid, caustic soda and alum, permitting the admixed brine to absorb and dissolve the ingredients specified, adding to the finished brine mixture lime, a pigment, a filler and water and mixing the latter ingredients with said brine mixture until a plastic, easily workable batch is produced, substantially in the manner described.

4. The process of producing a slow setting cementitious composition, which consists in providing an aqueous mixture of salt, magnesium oxid, alum and caustic soda, permitting the mixture to stand about 24 hours until all ingredients are dissolved, adding to the now ready aqueous mixture while stirring it a composition of pigment, lime, siliceous sand and water, and admixing still more water until a paste-like cementitious mixtures is obtained, substantially in the proportions and in the manner described.

Signed at New York, in the county and State of New York, this 26th day of March, 1931.

ADOLF SCHWALZ.